No. 794,962. PATENTED JULY 18, 1905.
H. F. WAITE.
MASSAGING IMPLEMENT.
APPLICATION FILED JAN. 25, 1905.
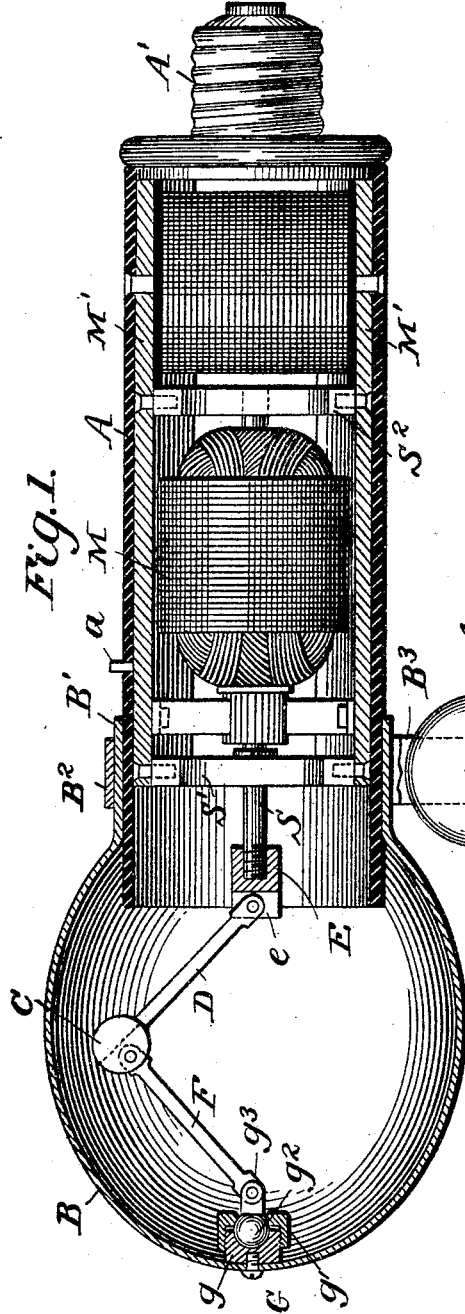
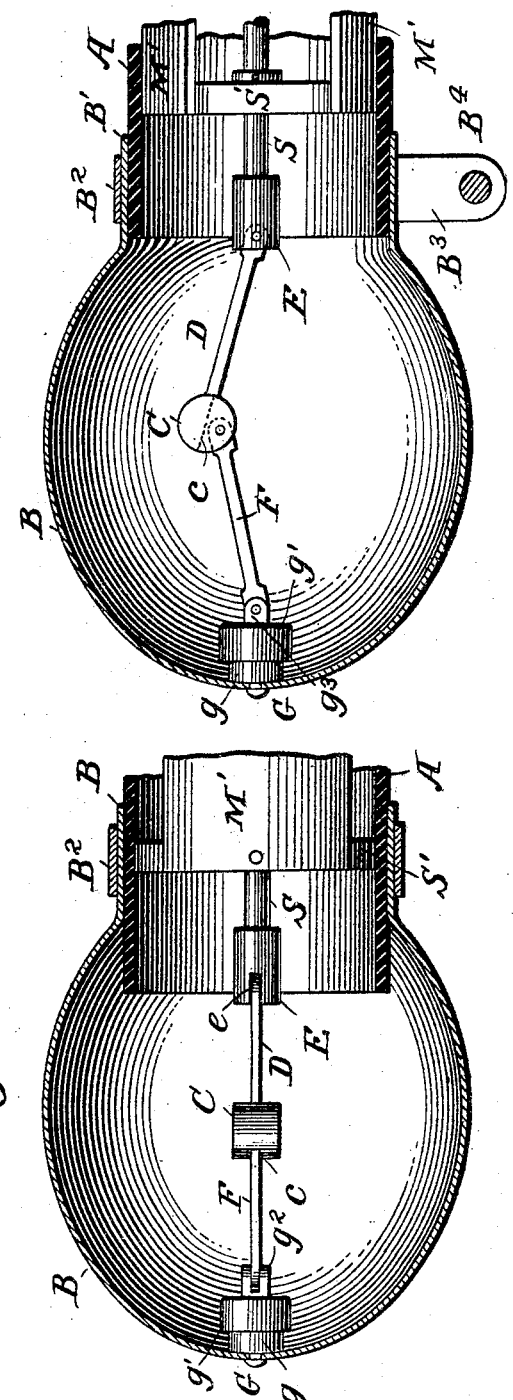
Inventor
Harry F. Waite.
Witnesses
Attorneys No. 794,962.

Patented July 18, 1905.

UNITED STATES PATENT OFFICE.

HARRY FULLER WAITE, OF NEW YORK, N. Y.

MASSAGING IMPLEMENT.

SPECIFICATION forming part of Letters Patent No. 794,962, dated July 18, 1905.

Application filed January 25, 1905. Serial No. 242,647.

*To all whom it may concern:*

Be it known that I, HARRY FULLER WAITE, a citizen of the United States, residing at New York, in the county and State of New York, have invented certain new and useful Improvements in Massaging Implements, of which the following is a specification.

My invention relates to massaging implements, and has for its object to improve and simplify such implements; and to these ends my invention consists in such an implement embodying various features of construction and arrangement of parts having the general mode of operation substantially as hereinafter more particularly set forth.

Referring to the accompanying drawings, wherein I have illustrated a preferred embodiment of my invention, Figure 1 is a longitudinal section through the implement. Fig. 2 is a similar partial longitudinal section through the vibrator, the section being at right angles to Fig. 1; and Fig. 3 is a similar partial longitudinal section showing the parts in different adjustment from that of Fig. 1.

One of the principal objects of my present invention is to provide a massaging implement wherein is utilized what is known as "the reaction of a rotating unbalanced weight" as a means for operating the implement or producing the vibrations and to utilize this in the most effective manner, so that vibrations of different periodicity and strength may be obtained, and thereby the character of the vibrations can be delicately adjusted so as to accomplish the desired results in the best manner.

As exemplified in the accompanying drawings, the implement embodies a casing A, which may be of any suitable construction and which is adapted to support or contain a suitable motor M. While this motor may be of any desired construction, either mechanical or electrical, it is preferable to use the electric motor shown, the detailed description of which it is unnecessary to give, as it is represented as an ordinary conventional series motor mounted in the casing and having an armature-shaft S, shown as supported in non-magnetic bearing-pieces S' S², extending between the pole-pieces M' M' of the motor. The casing A is shown as being provided with an ordinary usual connector A', adapted to fit the standard electric socket, by means of which power can be applied to the motor in the usual and conventional manner.

Mounted on the casing A is a vibrator B, shown in the form of a substantially spherical casing, and this is adjustably mounted with relation to the casing in any suitable way, it being shown in the present instance as having a neck or collar B', embracing the casing A, and as having suitable means for tightening the same, as a tightening-ring B², having projecting lips B³, adapted to be adjusted with relation to each other, as by a thumb-screw B⁴. While this is a convenient construction and permits the vibrator to slide along the casing and to be adjustably secured in any particular position, other adjusting means can be used for accomplishing the same general result. In this instance I have shown a stop $a$ on the casing for limiting the adjustment of the vibrator in one direction.

The rotary unbalanced weight C is connected to be rotated by the motor and is also connected so as to be adjustable with relation to the source of power or motor, so that it can be adjustable with relation to the axis of the motor-shaft, as it is well understood that not only is the rate of rotation or periodicity of the unbalanced weight determined by its angular relations to the axis of the shaft, but also its reactive force, this force being greater proportionately to the angular position of the weight with relation to the axial line of the source of power. While this adjustment and relation of the parts may be attained in many and various ways, I have shown in the present instance the weight C as being connected to the shaft S through the medium of a bar or rod D, pivotally connected to a head E. This head E is shown as screw-threaded internally to fit the screw-threaded end of the shaft S and also as having a slot $e$ in its end, in which is pivotally mounted the bar D, and in this instance the weight C is shown as an integral part of the bar D, although of course it may be separately made and attached to the bar. It will be evident that as the shaft rotates in one direction it will tend to secure the head E on the end of the shaft and will rotate the same and through this the bar D and the unbalanced weight C. This rotation of the unbalanced weight will produce vibrations in the vibrator in the well-known way due to the reaction of the unbalanced weight. As the periodicity and strength of these vibrations are determined by the relation of the weight to the axial line of the shaft, I provide means for adjusting the weight with relation to said line and for maintaining it in these adjusted relations during operation, and in the present instance I have shown a bar F, pivotally connected to a slot $c$ in the weight C and also connected to bearings mounted on the interior of the vibrator B at its end farthest from the casing. I have shown also as a preferred form of mounting the same a ball-and-socket connection, in which the bearing G includes a block $g$, secured to the vibrator, and an adjustable collar $g'$, adapted to embrace the ball-bearing $g^2$, a projection $g^3$ of which is pivotally connected to the bar F. It is evident that by adjusting the relations of this bearing G to the head or bearing E the relations of the rotating weight to the axial line will also be adjusted, and hence the rate of rotation or periodicity and strength of the vibrations produced by the unbalanced weight can be controlled. In the present instance, the bearing G being attached to the vibrator B, the vibrator can be adjusted longitudinally on the casing A, and manifestly this will change the relations of the bars D and F and adjust and hold the weight C in proper relation to the axial line between the two bearings, which axial line corresponds with the axis of the shaft S, and the nearer the weight approaches this axial line the more rapid will be the rotations and the more sensitive and delicate the vibrations, and vice versa.

The operation of the device will be largely understood by those skilled in the art from what has been stated above, and it will be observed that when the motor operates the unbalanced weight C is revolved and produces the reactive force in the manner well understood. The rate of rotation or periodicity of this weight depends largely upon its angular relations to the axis of the shaft of the motor by which it is rotated, and so by adjusting the bearing the angular relation of the weight to the axis of the shaft is varied by being increased or decreased, or, in other words, the circle through which the weight rotates is reduced or enlarged, and this results in varying the periodicity of the weight as well as its reactive force. The vibrator B may be placed in contact with the part of the person being treated, or the whole device may be held in the hand and the vibrations transmitted directly thereto.

While I have thus shown and described a specific embodiment of my invention and have provided an implement with a practically spherical vibrator which is adapted to be applied directly to the parts to be treated and the parts are so related that they may be adjusted to produce the desired effects, it is evident that the details of construction can be varied by those skilled in the art without departing from the spirit of my invention, and I do not limit myself to the precise details of construction shown.

What I claim is—

1. In a massaging implement, the combination with a casing, and a motor within the casing, of a vibrator adjustably connected with the casing, an unbalanced weight connected to be driven by the motor and mounted within the vibrator, and means connected with the vibrator for adjusting the weight, substantially as described.

2. In a massaging implement, the combination with a casing, and a motor within the casing, of a hollow vibrator adjustably mounted on the casing, an unbalanced weight within the vibrator connected to be driven by the motor, and means connected to the vibrator for adjusting the weight, substantially as described.

3. In a massaging implement, the combination with a casing, and a motor within the casing, of a hollow spherical vibrator adjustably mounted on the casing, a bearing mounted in the vibrator, an unbalanced weight within the vibrator, and connections between the unbalanced weight and bearing within the vibrator and the motor-shaft, substantially as described.

4. In a massaging implement, the combination with a casing, and a motor and motor-shaft mounted within the casing, of a hollow vibrator mounted on the casing, means for adjusting the same thereon, a head connected to the shaft of the motor, a weighted arm connected to said head, a bearing connected to the vibrator, an arm connected to the weight, and a ball connection between the bearing and arm, substantially as described.

In testimony whereof I have signed my name to this specification in the presence of two subscribing witnesses.

HARRY FULLER WAITE.

Witnesses:
HENRY E. WAITE,
E. H. OPITZ.